United States Patent
Tokunaga et al.

(10) Patent No.: US 9,252,523 B2
(45) Date of Patent: Feb. 2, 2016

(54) INTERLOCK MECHANISM OF MOTOR, AND MOTOR

(71) Applicant: Komatsu Ltd., Tokyo (JP)

(72) Inventors: Hiroyuki Tokunaga, Hiratsuka (JP); Akira Okabe, Naka-gun (JP); Teiichirou Chiba, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/369,786

(22) PCT Filed: Nov. 14, 2012

(86) PCT No.: PCT/JP2012/079546
§ 371 (c)(1),
(2) Date: Jun. 30, 2014

(87) PCT Pub. No.: WO2013/010660
PCT Pub. Date: Sep. 26, 2013

(65) Prior Publication Data
US 2014/0349516 A1    Nov. 27, 2014

(30) Foreign Application Priority Data

Mar. 21, 2012 (JP) .................................. 2012-063089

(51) Int. Cl.
| | |
|---|---|
| *H01R 13/60* | (2006.01) |
| *H01R 13/66* | (2006.01) |
| *H01R 13/516* | (2006.01) |
| *H02K 5/22* | (2006.01) |
| *H02K 5/10* | (2006.01) |
| *H02K 11/00* | (2006.01) |
| *H02K 15/00* | (2006.01) |

(52) U.S. Cl.
CPC ................ *H01R 13/516* (2013.01); *H02K 5/10* (2013.01); *H02K 5/225* (2013.01); *H02K 11/001* (2013.01); *H02K 11/0078* (2013.01); *H02K 15/0006* (2013.01); *H02K 11/0031* (2013.01); *H02K 11/0047* (2013.01)

(58) Field of Classification Search
CPC ....... H01R 13/516; H02K 5/225; H02K 5/10; H02K 11/0078; H02K 11/0031; H02K 15/0006; H02K 11/001; H02K 11/0047
USPC .......................................................... 439/527
See application file for complete search history.

(56) References Cited

U.S. PATENT DOCUMENTS

| | | | |
|---|---|---|---|
| 5,486,119 A * | 1/1996 | Nabeshima et al. | ......... 439/489 |
| 8,672,706 B2 | 3/2014 | Matsumoto et al. | |
| 2012/0238147 A1 * | 9/2012 | Matsumoto et al. | ......... 439/660 |

FOREIGN PATENT DOCUMENTS

| | | |
|---|---|---|
| JP | H10-126079 A | 5/1998 |
| JP | 2006-092776 A | 4/2006 |
| JP | 2010-246321 A | 10/2010 |
| JP | 2011-100551 A | 5/2011 |

OTHER PUBLICATIONS

International Search Report dated Feb. 19, 2013, issued for PCT/JP2012/079546.

* cited by examiner

*Primary Examiner* — Javaid Nasri
(74) *Attorney, Agent, or Firm* — Locke Lord LLP; James E. Armstrong, IV; Brian S. Matross

(57) ABSTRACT

An interlock mechanism of a motor, includes a terminal box configured to store a terminal used to connect a power supply cable to the motor; a lid configured to close the terminal box; a fixing member configured to fix the lid to the terminal box; a first connector attached to the lid; a second connector capable of being coupled with the first connector and configured to cover the fixing member in a state that the second connector is coupled with the first connector.

13 Claims, 9 Drawing Sheets

INTERLOCK MECHANISM OF MOTOR, AND MOTOR

FIELD

The present invention relates to an interlock mechanism of a motor and a motor including the same.

BACKGROUND

Motors are used in various kinds of applications. Electric power is supplied to a motor via a power supply cable. To secure safety in connection and disconnection of the power supply cable during maintenance and inspection of the motor, an interlock mechanism is provided. In Patent Literature 1, an interlock connector is provided between a removable lid and a casing of a high pressure unit, with the removal lid serving to check the operation of the high pressure unit, whereby power supply can be cut off by the interlock connector by removing the removable lid.

CITATION LIST

Patent Literature

Patent Literature 1: Japanese Patent Application Laid-open No. 2010-246321

SUMMARY

Technical Problem

The interlock connector disclosed in Patent Literature 1 is provided between the removable lid and the casing of the high pressure unit, and has a complicated structure. It is an object of the present invention to provide a simple structure to guarantee safety during connection and disconnection of the power supply cable to and from the motor.

Solution to Problem

According to the present invention, an interlock mechanism of a motor, comprises a terminal box configured to store a terminal used to connect a power supply cable to the motor; a lid configured to close the terminal box; a fixing member configured to fix the lid to the terminal box; a first connector attached to the lid; a second connector capable of being coupled with the first connector and configured to cover the fixing member in a state that the second connector is coupled with the first connector.

In the present invention, it is preferable that the fixing member is a bolt configured to fasten the lid to the terminal box, and a distance between the fixing member and the second connector attached to the first connector is shorter than an entire length of the fixing member.

In the present invention, it is preferable that the fixing member receives an attachment/detachment tool of the fixing member from a side of the first connector.

In the present invention, it is preferable that the lid has an attaching portion to which the first connector is attached.

In the present invention, it is preferable that the lid has a plurality of the attaching portions.

In the present invention, it is preferable that the number of the attaching portions is greater than the number of the first connector.

In the present invention, it is preferable that the lid has a plurality of lid-side attaching portions capable of supporting the attaching portion.

In the present invention, it is preferable that the number of the lid-side attaching portions is greater than the number of the first connector.

In the present invention, it is preferable that the attaching portion is integrated with the lid.

In the present invention, it is preferable that the attaching portion has a plurality of positions to which the first connector is attached.

In the present invention, it is preferable that the number of the positions to which the first connector is attached is greater than the number of the first connector.

According to the present invention, an interlock mechanism of a motor, comprises a terminal box configured to store a terminal used to connect a power supply cable to the motor; a lid configured to close the terminal box; a plurality of fixing members configured to fix the lid to the terminal box; a first connector attached to the lid; a second connector capable of being coupled with the first connector and configured to cover at least one of the plurality of fixing members from a side of a removing direction thereof in a state that the second connector is coupled with the first connector; and a plurality of attaching portions to which the first connector is attached, the number of which is greater than the number of the first connector, and which are capable of being integrated with the lid, wherein a distance between the fixing member and the second connector attached to the first connector is shorter than an entire length of the fixing member, and the fixing member receives an attachment/detachment tool of the fixing member from a side of the second connector attached to the first connector.

According to the present invention, a motor comprises the interlock mechanism of a motor.

According to the present invention, it is possible to guarantee safety with a simple structure during connection and disconnection of a power supply cable to and from the motor.

BRIEF DESCRIPTION OF DRAWINGS

FIG. 2-1 is a plan view illustrating the interlock mechanism of the motor according to the present embodiment.

FIG. 2-2 is an enlarged view of the interlock mechanism of the motor according to the present embodiment.

FIG. 2-3 is an enlarged view of the interlock mechanism of the motor according to the present embodiment.

FIG. 3 is an explanatory view of an interlock.

DESCRIPTION OF EMBODIMENTS

Modes for carrying out the present invention (embodiments) will be described in detail below with reference to the accompanying drawings. The present invention will not be limited by the following description of the embodiments. Some constituent elements described below may easily be devised by those skilled in the art, or substantially the same constituent elements may be provided. Also, some constituent elements described below may be properly combined. Further, the constituent elements may be deleted, replaced, or changed without departing from the scope and spirit of the present invention.

<Interlock Mechanism of Motor>

Figure 1:
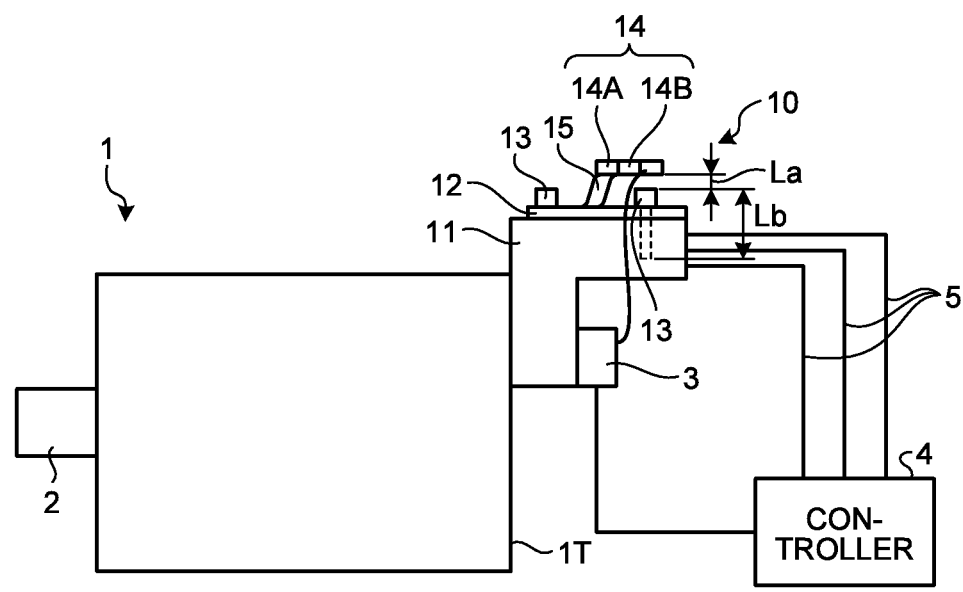
FIG. 1 illustrates an interlock mechanism of a motor and a motor including the same according to the present embodiment.
Figures 1, 2:
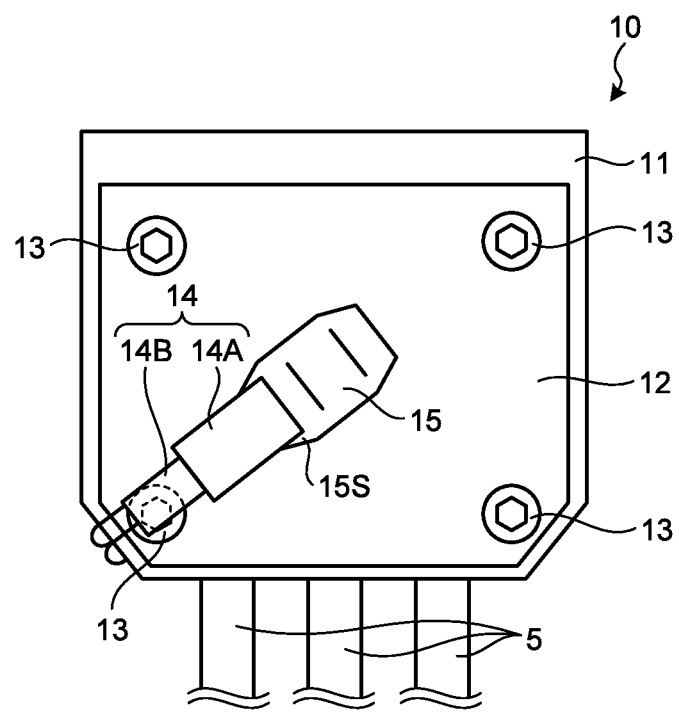
Figure 2:
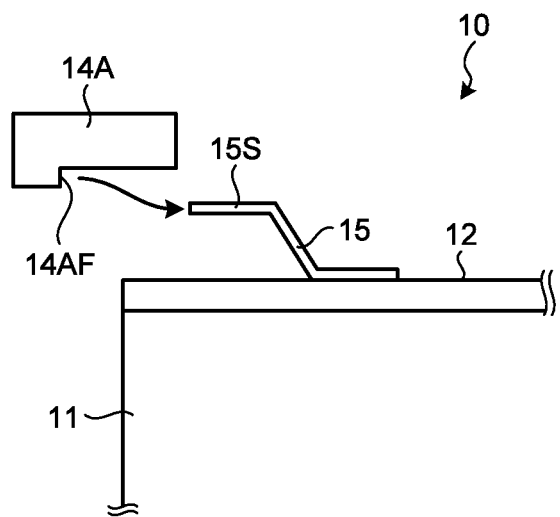
Figures 2, 3:
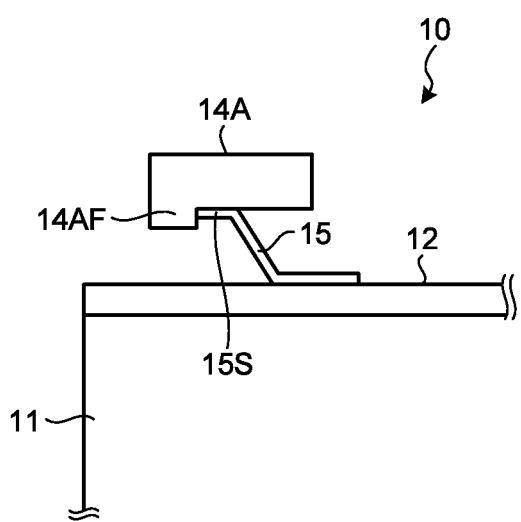
Figure 3:
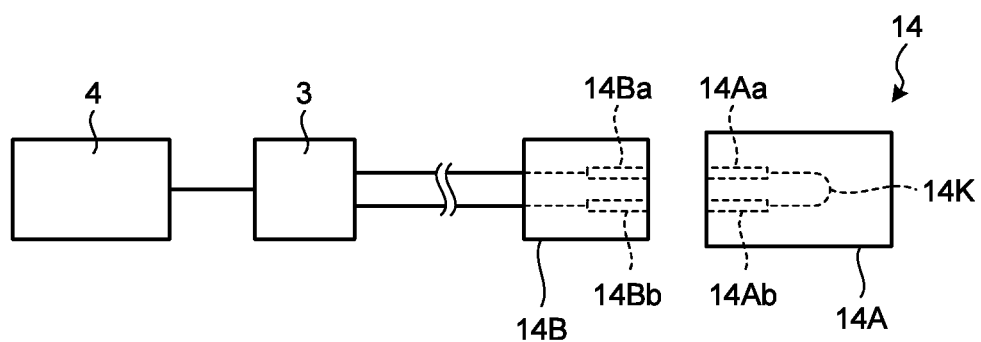

FIG. 1 illustrates an interlock mechanism of a motor and a motor including the same according to the present embodiment. FIG. 2-1 is a plan view of the interlock mechanism of the motor according to the present embodiment. FIGS. 2-2 and 2-3 are enlarged views of the interlock mechanism of the motor according to the present embodiment. FIG. 3 is an explanatory view of an interlock according to the present embodiment. A motor 1 includes an interlock mechanism 10 of the motor according to the present embodiment (hereinafter simply referred to as interlock mechanism, as necessary). The interlock mechanism 10 can be applied to any kind of motors.

The motor 1 includes a terminal box 11. The terminal box 11 is attached to an end 1T opposite to an end where an output shaft 2 of the motor 1 penetrates through and is taken out. Power supply cables 5 and a sensor connection connector 3 are connected to the terminal box 11. The power supply cables 5 and the sensor connection connector 3 are connected to a controller 4 configured to control the motor 1. Wirings are gathered in the sensor connection connector 3 from sensors, such as a resolver that detects a rotation angle of the output shaft of the motor 1 and a thermistor that detects temperatures of the motor 1, and from an interlock connector 14 included in the interlock mechanism 10. The controller 4 obtains detection signals from these sensors and the interlock connector 14 via the sensor connection connector 3. The power supply cables 5 are electrically connected to coils of a stator in the motor 1 to supply electric power to the coils.

The controller 4 is an apparatus configured to control a rotation speed, a rotation direction, and torque of the output shaft 2 of the motor 1. The controller 4 includes an inverter or the like and controls power supply to the motor 1 based on the detection signals from the sensors of the motor 1 obtained via the sensor connection connector 3, as well as a control signal generated based on a command value for the motor 1. The electric power from the controller 4 is supplied to the motor 1 through the power supply cables 5.

The power supply cables 5 may sometimes be disconnected from the terminal box 11 for maintenance and inspection of the motor 1. When the power supply cables 5 are connected and disconnected to and from the terminal box 11, the interlock mechanism 10 functions to stop feeding power to the power supply cables 5 from the controller 4. Thus, the interlock mechanism 10 guarantees safety of the motor 1 during connection and disconnection of the power supply cables 5.

The interlock mechanism 10 includes the terminal box 11, a lid 12, bolts 13 serving as fixing members, a first connector 14A, and a second connector 14B. The interlock connector 14 is formed by the first connector 14A and the second connector 14B. The terminal box 11 has terminals for connecting the power supply cables 5 to the motor 1. The terminal box 11 has an opening for inserting tools, etc. to connect the power supply cables. The lid 12 is attached to the opening of the terminal box 11 to close the opening.

The bolts 13 are screwed into bolt holes formed in the terminal box 11 from the outside of the lid 12 to thereby fasten and fix the lid 12 to the terminal box 11. In the present embodiment, the lid 12 is fastened to the terminal box 11 by using the bolts 13 as fixing members, but the fixing members are not limited thereto. In the present embodiment, the first connector 14A is attached to the lid 12. In the present embodiment, as illustrated in FIGS. 2-1 to 2-3, the lid 12 has an attaching portion 15 to which the first connector 14A is attached. In the present embodiment, the attaching portion 15 includes a port 15S to which the first connector 14A can be attached (connector attaching port). The attaching portion 15 is mounted on the lid 12, and the first connector 14A is attached to the connector attaching port 15S of the attaching portion 15. That is, the first connector 14A is attached to the lid 12 via the attaching portion 15. To attach the first connector 14A to the connector attaching port 15S of the attaching portion 15, a connector-side attaching portion 14AF of the first connector 14A is attached by being inserted into the connector attaching port 15S, as illustrated in FIGS. 2-2 and 2-3.

The second connector 14B can be coupled with the first connector 14A. With the second connector 14B being coupled with the first connector 14A, as illustrated in FIGS. 1 and 2-1, the second connector 14B externally covers the bolt 13. Specifically, the second connector 14B is coupled with the first connector 14A to cover the bolt 13 from the side of the bolt head of the bolt 13. That is, "externally" means "from the external side of the bolt head." When the second connector 14B coupled with the first connector 14A is viewed from the side of the bolt head of the bolt 13, it looks like that the second connector 14B and the bolt head of the bolt 13 overlap each other. In this case, the second connector 14B is arranged on the side of a bolt removing direction (in the present embodiment, a direction in which the bolt 13 is removed from the terminal box 11 and the lid 12) of the bolt 13 that serves as a fixing member. That is, the second connector 14B covers the bolt 13 in the bolt removing direction, with the second connector 14B being coupled with the first connector 14A. When the bolt 13 serves as the fixing member, the second connector 14B covers the bolt head of the bolt 13. Accordingly, the bolt 13 cannot be removed from the terminal box 11 without removing the second connector 14B from the first connector 14A, when the lid 12 is removed from the terminal box 11. In the present embodiment, a plurality of bolts (four bolts in this example) 13 is used to fix the lid 12 to the terminal box 11. In this case, the second connector 14B externally covers at least one bolt 13 among the plurality of bolts 13 that fix the lid 12 to the terminal box 11.

Next, the structure of the interlock connector 14 will be described with reference to FIG. 3. The first connector 14A has two terminals 14Aa and 14Ab, and the second connector 14B has two terminals 14Ba and 14Bb. When the first connector 14A is coupled with the second connector 14B, the terminal 14Aa of the first connector 14A is electrically connected to the terminal 14Ba of the second connector 14B, and the terminal 14Ab of the first connector 14A is electrically connected to the terminal 14Bb of the second connector 14B. The terminals 14Ba and 14Bb of the second connector 14B are electrically connected to the controller 4 via the sensor connection connector 3. The terminals 14Aa and 14Ab of the first connector 14A are electrically connected with each other via a wiring 14K.

When the first connector 14A is coupled with the second connector 14B, a closed circuit is formed by the terminals 14Ba and 14Bb of the second connector 14B, the terminals 14Aa and 14Ab of the first connector 14A, and the wiring 14K. That is, the interlock connector 14 forms a closed circuit. The controller 4 detects the current flow in the interlock connector 14 and supplies power to the motor 1 via the power supply cables 5. When the second connector 14B is removed from the first connector 14A, the electrical connection is cut off between the terminals 14Ba and 14Bb of the second connector 14B and the terminals 14Aa and 14Ab of the first connector 14A, such that a closed circuit is not formed by the interlock connector 14. In this state, there is no current flow in the interlock connector 14. When no current flow in the interlock connector 14 is detected, the controller 4 stops supplying power to the motor 1. That is, the controller 4 stops power feed to the power supply cables 5. Thus, the interlock is released when the first connector 14A is coupled with the second connector 14B, and the interlock is set when the first connector 14A is removed from the second connector 14B.

In the interlock mechanism 10, the bolts 13 cannot be removed from the terminal box 11 to remove the lid 12 from the terminal box 11, and the power supply cables 5 cannot be connected or disconnected in the terminal box 11, unless the interlock is set by removing the second connector 14B from the first connector 14A. Thus, the interlock mechanism 10 does not allow access to the connecting portion of the power supply cables 5 in the terminal box 11 without setting the interlock to stop power feed to the power supply cable 5. That is, to access the connecting portion of the power supply cables 5 in the terminal box 11, the interlock mechanism 10 can create a no-power-feed state in the power supply cables 5 by setting the interlock by removing the second connector 14B from the first connector 14A. Accordingly, the interlock mechanism 10 guarantees safety during connection and disconnection of the power supply cables 5 in the terminal box 11. The interlock mechanism 10 can also guarantee safety with a simple structure during connection and disconnection of the power supply cables 5 to and from the motor 1, because the setting and releasing of the interlock can be realized by connection and disconnection of the first connector 14A and the second connector 14B included in the interlock connector 14. Further, the interlock mechanism 10 can be formed easily without preparing dedicated parts, as a multipurpose connector can be used as the interlock connector 14.

As illustrated in FIG. 1, assuming that a distance between the bolt 13 and the second connector 14B attached to the first connector 14A is La and the entire length of the bolt 13 is Lb, La is preferably set to be shorter than Lb. Accordingly, the removal of the bolt 13 from the terminal box 11 can be prevented by the second connector 14B, even when a tool such as a wrench is inserted from the side of the bolt 13 to loosen the bolt 13. Thus, by satisfying La<Lb, the removal of the bolt 13 from the terminal box 11 can be more reliably prevented when the second connector 14B is attached to the first connector 14A. Accordingly, reliability of the interlock mechanism 10 can be improved and its safety can be guaranteed more securely.

The kind of the bolt 13 is not particularly limited, but the bolt 13 is preferably not a kind of bolt in which an attachment/detachment tool is attached to the bolt head from the side of the bolt head (from a direction perpendicular to the axis of the bolt 13, or a direction perpendicular to the traveling direction of the bolt 13). That is, the bolt 13 is preferably of a kind that the attachment/detachment tool is attached to the bolt head along the bolt traveling direction. Accordingly, the bolt 13 used herein as the fixing member includes an attachment/detachment tool attached thereto preferably from the side of the first connector 14A. An example of this kind of bolt is a so-called cap bolt which is a bolt with a hexagonal hole formed therein. When this kind of bolt is used as the bolt 13, attachment of the attachment/detachment tool from the side of the bolt head would be eliminated from attaching choices of the attachment/detachment tool to the bolt head, whereby the second connector 14B has to be removed from the first connector 14A. By removing the second connector 14B from the first connector 14A, the interlock is set to improve safety during connection and disconnection of the power supply cables 5.

In the present embodiment, the first connector 14A is attached to the connector attaching port 15S of the attaching portion 15 provided on the lid 12. A method to mount the attaching portion 15 on the lid 12 is not particularly limited, but it is preferable that the attaching portion 15 and the lid 12 be made of metal, and the attaching portion 15 be fixed to the lid 12 by welding. Since the attaching portion 15 is integrated with the lid 12 in this manner, a situation such as removing the first connector 14A coupled with the second connector 14B from the lid 12 together with the attaching portion 15 would not happen. Accordingly, it is possible to guarantee safety more securely. This structure is also advantageous in that, as the attaching portion 15 and the lid 12 are provided separately, the degree of freedom in design of these constituent elements can be improved. A method to integrate the lid 12 with the attaching portion 15 is not limited to welding, and it may be possible to produce the lid 12 and the attaching portion 15 as one member by casting. Alternatively, the attaching portion 15 and the lid 12 may be integrated by fastening them together by a bolt. Next, a procedure of disconnecting the power supply cables 5 will be described.

Figure 4:
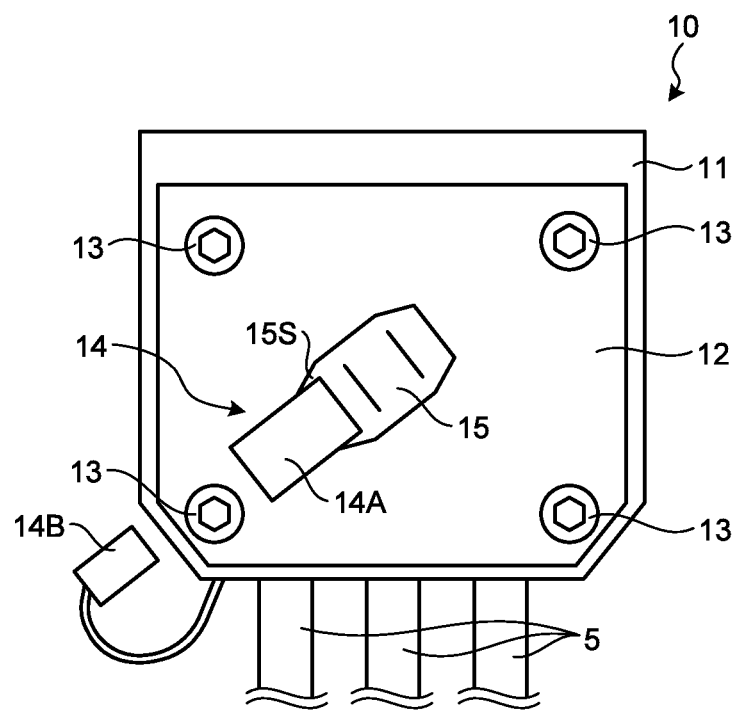
FIG. 4 is an explanatory view of a procedure of disconnecting a power supply cable 5 from the motor including the interlock mechanism according to the present embodiment.
Figure 5:
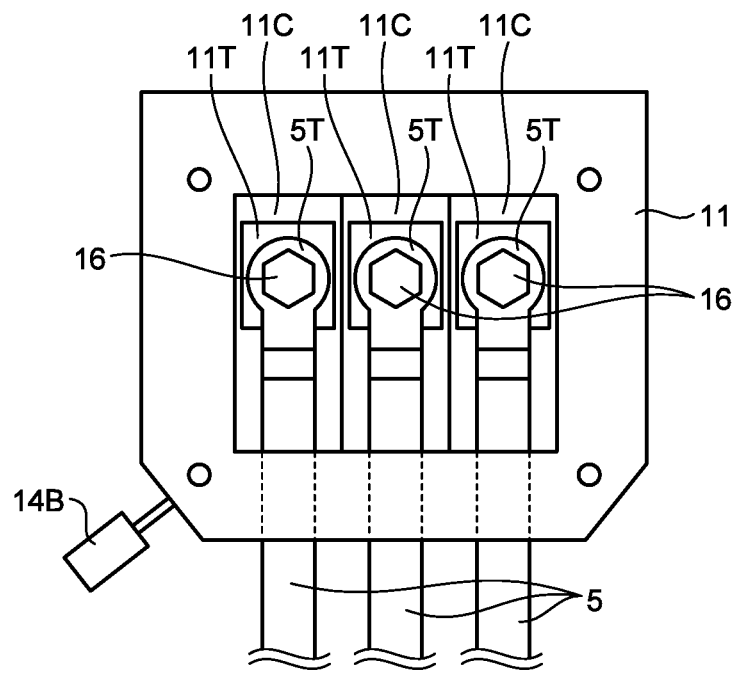
FIG. 5 is an explanatory view of a procedure of disconnecting the power supply cable 5 from the motor including the interlock mechanism according to the present embodiment.
Figure 6:
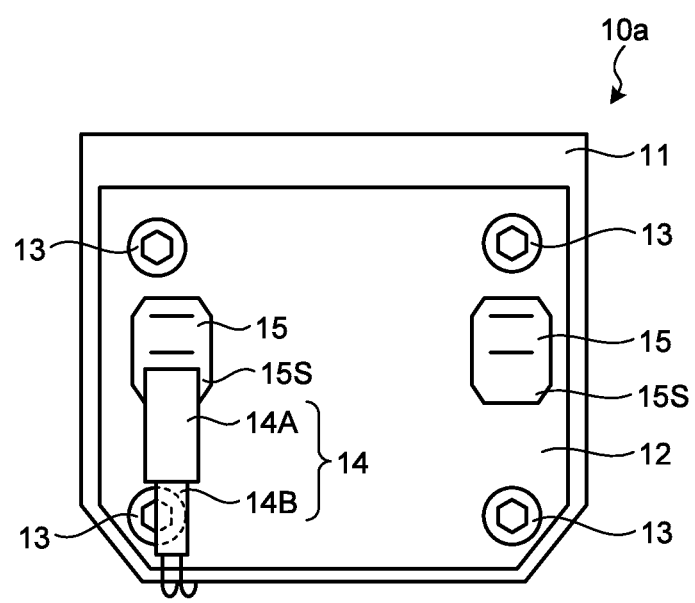
FIG. 6 illustrates a modified example of the interlock mechanism according to the present embodiment.

FIGS. 4 and 5 are explanatory views of a procedure of disconnecting the power supply cables 5 from the motor that includes the interlock mechanism according to the present embodiment. To disconnect the power supply cables 5 from the terminal box 11 of the motor 1 illustrated in FIG. 1, the second connector 14B is removed from the first connector 14A of the interlock connector 14 as illustrated in FIG. 4. Accordingly, the interlock is set and the power feed to the power supply cables 5 is stopped. When the second connector 14B is removed from the first connector 14A, the bolt 13 is seen as illustrated in FIG. 4. In this state, the bolts 13 are loosened and taken out, and the lid 12 can be removed from the terminal box 11.

When the lid 12 is removed from the terminal box 11, as illustrated in FIG. 5, terminal fixing bolts 16, which serve as terminal fixing members to fix terminals (cable terminals) 5T of the power supply cables 5 to terminals (motor terminals) 11T in the terminal box 11, are seen. The cable terminals 5T may be crimp terminals. Inner space of the terminal box 11 is divided into three terminal attaching spaces 11C. Adjacent terminal attaching spaces 11C are separated from each other by a highly insulating material (such as resin) to secure electrical insulation. When the lid 12 is removed from the terminal box 11, the terminal fixing bolts 16 can be loosened by attaching a tool to the bolts, and the cable terminals 5T can be removed from the motor terminals 11T.

Thus, the interlock mechanism 10 does not allow removal of the lid 12 from the terminal box 11 without taking the procedure of removing the second connector 14B from the first connector 14A of the interlock connector 14, and it is not possible to connect and disconnect the cable terminals 5T to and from the motor terminals 11T. When the second connector 14B is removed from the first connector 14A, the interlock is set and the power feed to the power supply cables 5 is stopped. This improves safety during connection and disconnection of the cable terminals 5T to and from the motor terminals 11T.

<Modified Example of Interlock Mechanism>

FIGS. 6 to 10 illustrate modified examples of the interlock mechanism according to the present embodiment. In an interlock mechanism 10a illustrated in FIG. 6, the lid 12 includes a plurality of attaching portions (two attaching portions in this modified example) 15, each having the connector attaching port 15S to which the first connector 14A of the interlock connector 14 is attached. Thus, the number of attaching portions 15 of the lid 12 is greater than the actual number of the first connectors 14A included in the interlock mechanism 10a. This increases the number of choices of attaching portions of the first connector 14A. Accordingly, if the interlock connector 14 may interfere with other parts or the like in relation to the attaching port of the motor 1, it would be possible to avoid such an interference with other parts or the like by attaching the first connector 14A to a different attaching portion 15. The number of the attaching portions 15 of the lid 12 is not limited to two.

Figure 7:
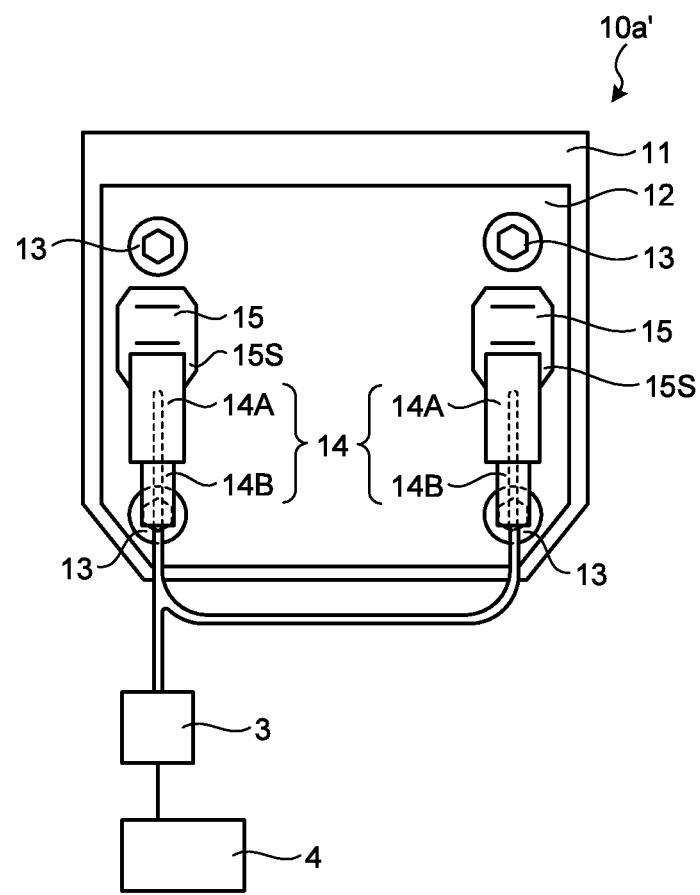
FIG. 7 illustrates a modified example of the interlock mechanism according to the present embodiment.

When the lid 12 includes a plurality of attaching portions 15, the first connectors 14A of the interlock connector 14 may be attached to the respective attaching portions 15, as in an interlock mechanism 10a' illustrated in FIG. 7. When the second connectors 14B are respectively attached to the first connectors 14A, each of the second connectors 14B attached to the first connectors 14A externally covers a different bolt 13. Since all the bolts 13 that fix the lid 12 to the terminal box 11 cannot be removed without removing the two second connectors 14B from the first connectors 14A, which improves safety more securely.

When the plurality of interlock connectors 14 is used, as illustrated in FIG. 7, the plurality of second connectors 14B may be connected in series to electrically connect to the controller 4 via the sensor connection connector 3. In this case, when at least one of the second connectors 14B of the plurality of interlock connectors 14 is removed from the first connector 14A, a closed circuit formed by the plurality of interlock connectors 14 is cut off and the interlock is set. That is, the interlock can be set even when all the second connectors 14B are not removed from the first connectors 14A, which leads to improved safety.

Figure 8:
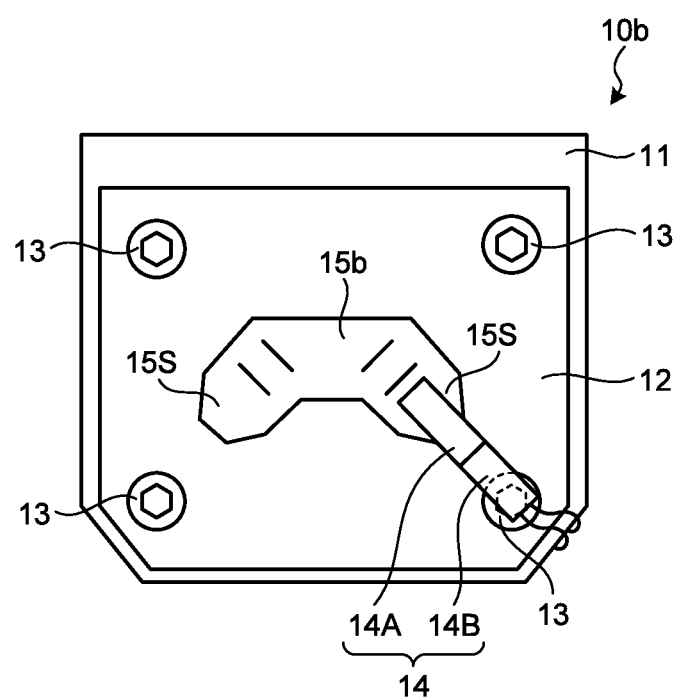
FIG. 8 illustrates a modified example of the interlock mechanism according to the present embodiment.

FIG. 8 illustrates an example of an interlock mechanism 10b that includes the lid 12 having a single attaching portion 15b and the attaching portion 15b has a plurality of (two in this example) connector attaching ports 15S to which the first connector 14A is attached. The connector attaching ports 15S are directed toward different bolts 13. When the interlock connector 14 is attached to one of the connector attaching ports 15S, the second connector 14B externally covers the bolt 13 while being coupled with the first connector 14A. By using the attaching portion 15b having the plurality of connector attaching ports 15S to which the interlock connector 14 is attached, even the plurality of interlock connectors 14 can be attached to one attaching portion 15b.

Figure 9:
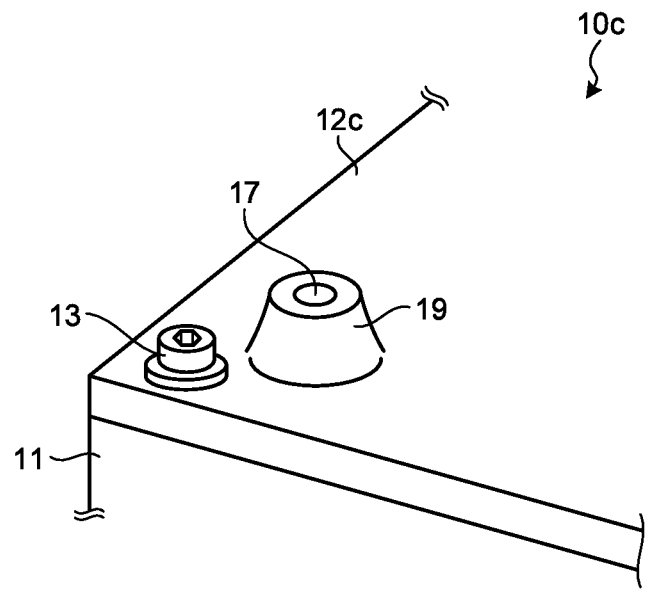
FIG. 9 illustrates a modified example of the interlock mechanism according to the present embodiment.
Figure 10:
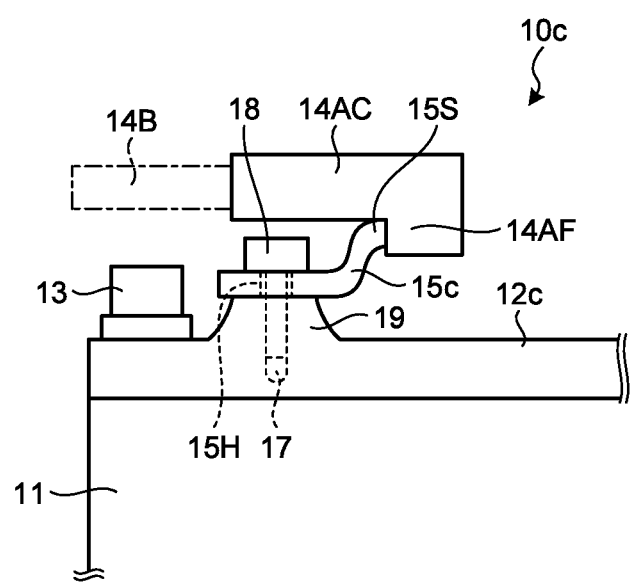
FIG. 10 illustrates a modified example of the interlock mechanism according to the present embodiment.

FIGS. 9 and 10 illustrate an interlock mechanism 10c in which an attaching portion 15c is attached to a lid-side attaching portion 19 that projects from a part of a lid 12c. The lid-side attaching portion 19 is a part of the lid 12c. The lid-side attaching portion 19 has a bolt hole 17 to which a connector attaching bolt 18 is screwed as illustrated in FIG. 10, and is capable of supporting the attaching portion 15c. The attaching portion 15c is made of metal and has a bolt hole 15H. To mount the attaching portion 15c on the lid-side attaching portion 19, the connector attaching bolt 18 is made to penetrate through the bolt hole 15H, and the connector attaching bolt 18 is then screwed into the bolt hole 17 of the lid-side attaching portion 19. By fastening the attaching portion 15c to the lid-side attaching portion 19 with the connector attaching bolt 18 in this manner, the attaching portion 15c can be attached to the lid-side attaching portion 19 formed as a part of the lid 12c. A connector-side attaching portion 14AF of a first connector 14AC is inserted into the connector attaching port 15S of the attaching portion 15c to attach the first connector 14AC to the attaching portion 15c.

In this example, when the first connector 14AC is attached to the attaching portion 15c, the first connector 14AC covers the connector attaching bolt 18 having been screwed into the bolt hole 17 of the lid-side attaching portion 19 from the side of the bolt removing direction of the connector attaching bolt 18. The connector attaching bolt 18 is preferably of a kind that an attachment/detachment tool is attached to the bolt head along the traveling direction of the bolt 18, and a cap bolt may be used, for example. After the first connector 14AC is attached to the attaching portion 15c, therefore, the connector attaching bolt 18 cannot be loosened, and thus the first connector 14AC cannot be removed from the lid-side attaching portion 19 while the second connector 14B is attached to the first connector 14A. Accordingly, the removal of the bolt 13 while the interlock is released can be avoided in the interlock mechanism 10c, which can guarantee safety more securely.

When the second connector 14B is attached to the first connector 14AC having been attached to the lid 12c through the attaching portion 15c and the lid-side attaching portion 19, the second connector 14B covers the bolt 13 from the side of the bolt head. To remove the lid 12c from the terminal box 11 in the interlock mechanism 10c, the second connector 14B has to be removed from the first connector 14A to remove the bolt 13 from the terminal box 11. Similarly to the interlock mechanism 10 (see FIG. 2-1, for example), therefore, the interlock mechanism 10c can also reliably guarantee safety in connection and disconnection of the power supply cables 5 in the terminal box 11.

The lid-side attaching portion 19 may be produced as an integral part with the lid 12c by casting, for example. This may simplify the manufacturing process, as the step of attaching the attaching portion 15 to the lid 12 as illustrated in FIG. 2-1, etc. can be eliminated. In this example, one lid-side attaching portion 19 is provided, but the lid 12c may include more than one lid-side attaching portion 19. Thus, the degree of freedom at the portion where the first connector 14AC is attached to the lid 12c can be improved. In this case, the number of the lid-side attaching portions 19 may not be equal to the number of the attaching portions 15c. For example, the number of the lid-side attaching portions 19 may be greater than the number of the attaching portions 15c. Further, the lid-side attaching portion 19 may not project from the lid 12c. For example, when the bolt hole is formed in the lid to directly attach the attaching portion 15c to the lid with a bolt or the like, the bolt hole serves as the lid-side attaching portion.

Next, an exemplary application of the motor 1 having the interlock mechanism 10, 10a, etc. will be described. In the following, the motor 1 including the interlock mechanism 10, 10a, etc. will be described when it is applied to travelling of a kind of construction vehicles, or a wheel loader. The application of the motor 1 having the interlock mechanism 10, 10a, etc. is not limited to the construction vehicles and may also be applied to any construction vehicle other than a wheel loader.

<Wheel Loader>

Figure 11:
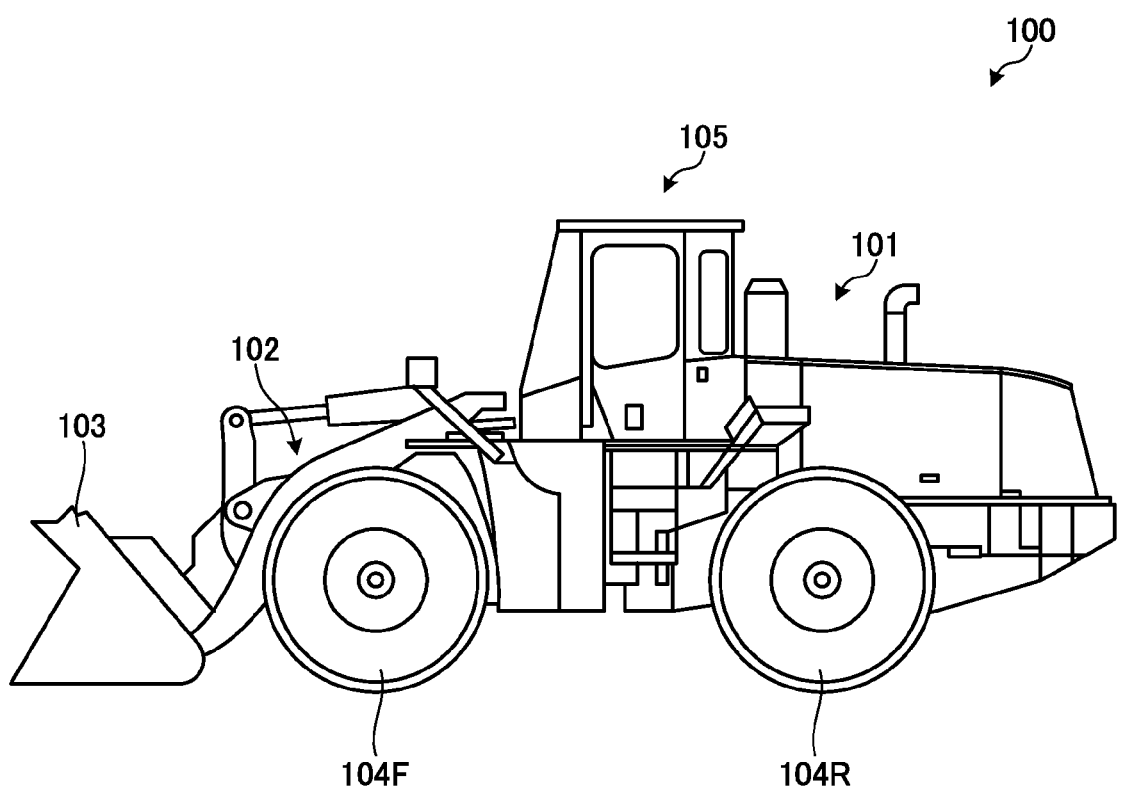
FIG. 11 is an explanatory view of a wheel loader.

FIG. 11 is an explanatory view of a wheel loader. A wheel loader 100 includes a vehicle body 101, a lift arm (work machine) 102 attached at the front of the vehicle body 101, a bucket (work machine) 103 attached at the tip end of the lift arm 102, two front wheels 104F and two rear wheels 104R configured to rotate to drive the vehicle body 101 while supporting the vehicle body 101, and a cab 105 mounted on the upper part of the vehicle body 101.

Figure 12:
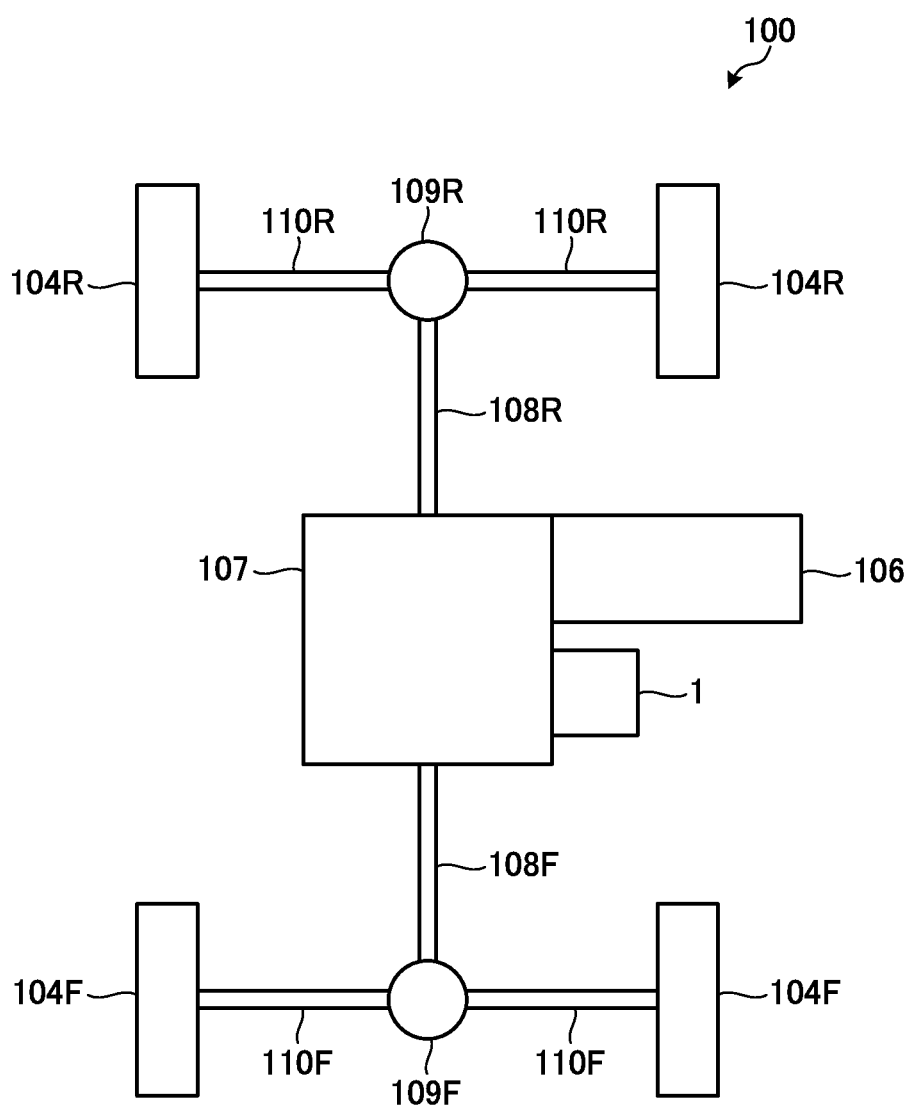
FIG. 12 is a schematic diagram illustrating a driving system of the wheel loader.

FIG. 12 is a schematic diagram illustrating a drive system of the wheel loader. In the present embodiment, the wheel loader 100 includes an internal combustion engine 106, such as a diesel engine or a gasoline engine, as a power generation source for driving the vehicle, and the motor 1. Thus, a so-called hybrid system is used in the drive system of the wheel loader 100. In the present embodiment, the wheel loader 100 includes one motor 1, but the number of the motor 1 is not limited thereto. As described above, the motor 1 has the interlock mechanism 10, 10a, etc.

The output of the internal combustion engine 106 and the output of the motor 1 are input to a transmission device 107. The output of the motor 1 may be input to the transmission device 107 via a deceleration device. The transmission device 107 combines the output of the internal combustion engine 106 and the output of the motor 1 and supplies a combined result to a front wheel-side propeller shaft 108F and a rear wheel-side propeller shaft 108R. The output of the front wheel-side propeller shaft 108F is transmitted to the two front wheels 104F via a front wheel-side differential gear 109F and front wheel-side drive shafts 110F. The output of the rear wheel-side propeller shaft 108R is transmitted to the two rear wheels 104R via a rear wheel-side differential gear 109R and rear wheel-side drive shafts 110R. Thus, the output of the internal combustion engine 106 and the output of the motor 1 are transmitted to the front wheels 104F and the rear wheels 104R to make the wheel loader 100 travel.

In driving the wheel loader 100, the output of the internal combustion engine 106 alone or the output of the motor 1 alone may be transmitted to the transmission device 107. That is, both the output of the motor 1 and the output of the internal combustion engine 106 are not always transmitted to the transmission device 107 in driving the wheel loader 100. The number of the motor 1 is not limited to one, and more than one motor 1 may be provided. Further, the wheel loader 100 includes an inverter to control the operation (powering operation or regenerative operation) of the motor 1, and a power storage device such as a capacitor or a secondary battery for storing energy (electric power) obtained from regeneration of the motor 1. In the present embodiment, the wheel loader 100 may not include an internal combustion engine and may be implemented as an electric vehicle (working vehicle or construction vehicle) including the motor 1 as a drive source using power from a power storage device. That is, the motor 1 of the present embodiment is applicable to hybrid vehicles and electric vehicles.

In the present embodiment, the motor 1 and the internal combustion engine 106 are arranged transversely. That is, the motor 1 and the internal combustion engine 106 are arranged in such a manner that the transmission shafts of the motor 1 and the internal combustion engine 106 are located perpendicular to a traveling direction of the wheel loader 100 when it travels straight forward. More specifically, the transmission shafts of the motor 1 and the internal combustion engine 106 are located perpendicular to the front wheel-side propeller shaft 108F and the rear wheel-side propeller shaft 108R. However, the arrangement of the motor 1 and the internal combustion engine 106 is not limited to the transverse arrangement, and the motor 1 and the internal combustion engine 106 can be arranged longitudinally so as to arrange the transmission shafts of the motor 1 and the internal combustion engine 106 to be parallel with the front wheel-side propeller shaft 108F and the rear wheel-side propeller shaft 108R.

It is desired to decrease the size of the motor 1 when it is installed on a construction machine or the like. When a construction machine such as the wheel loader 100 is made to travel by the motor 1, a large current flows through the power supply cables 5. This would increase diameters of the power supply cables 5. The power supply cables 5 can be connected to the motor 1 via connectors; however, as the diameters of the power supply cables 5 are increased, the size of the connector is also increased. Therefore, a demand for the smaller motor 1 may not be satisfied. In the case where the power supply cables 5 are connected to the motor 1 via the connector, the interlock mechanism may be incorporated in the connector used for supplying power. This method cannot be realized easily and may decrease versatility, because the size of the connector is increased and the connector may need to be remade along with the change of the size of the power supply cables 5.

The interlock mechanism 10, 10a, etc. uses the interlock connector 14, and also uses the second connector 14B arranged on the bolt removing direction side of the bolt 13 by which the lid 12 is fixed to the terminal box 11. This eliminates the need to incorporate the interlock mechanism in the connector used for supplying power, whereby the interlock can be realized with a simple structure. Also, as it is not necessary to connect the power supply cables 5 to the motor 1 via the connector, the connector used for supplying power can be eliminated. Accordingly, an entirely compact motor 1 can be provided. Further, the interlock mechanism 10, 10a, etc. advantageously has high versatility, as it can be realized by the interlock connector 14 regardless of whether there is a connector used for supplying power. In this method where the interlock mechanism is incorporated in the connector used for supplying power, the connector used for supplying power may be replaced if a defect occurs somewhere in the interlock mechanism or the power supply portion. However, since it is sufficient to only replace the defected part, the interlock mechanism 10, 10a, etc. is advantageous in carrying out maintenance. Thus, the interlock mechanism 10, 10a, etc. is preferably used in the applications such as travelling of a construction machine where a large current flows through the power supply cables 5.

As described above, the present embodiment and the modification thereof use the interlock connector having the first connector and the second connector attached to the first connector. The lid is fixed to the terminal box by the fixing member configured to close the terminal box, and the fixing member is covered by the second connector arranged on the removing direction side of the fixing member while the second connector is coupled with the first connector. With the second connector being coupled with the first connector, the interlock mechanism can be realized simply by arranging the interlock connector in such a manner that the second connector covers the fixing member from the removing direction side thereof. In this case, a general-purpose interlock connector can be used, and only the attaching portion can be provided to attach the first connector on the existing lid, whereby the design change of the terminal box is not necessary. Accordingly, it is possible to guarantee safety with a simple structure during connection and disconnection of the power supply cables to and from the motor.

REFERENCE SIGNS LIST

1 MOTOR
2 OUTPUT SHAFT
3 SENSOR CONNECTION CONNECTOR
4 CONTROLLER
5 POWER SUPPLY CABLE
5T CABLE TERMINAL
10, 10a, 10a', 10b, 10c INTERLOCK MECHANISM
11 TERMINAL BOX
11C TERMINAL ATTACHING SPACE
11T MOTOR TERMINAL
12,12c LID
13 BOLT
14 INTERLOCK MECHANISM
14A, 14AC FIRST CONNECTOR
14B SECOND CONNECTOR
14Aa, 14Ab, 14Ba, 14Bb TERMINAL
14K WIRING
15, 15b, 15c ATTACHING PORTION
15S CONNECTOR ATTACHING PORT
16 TERMINAL FIXING BOLT
17 BOLT HOLE
18 CONNECTOR ATTACHING BOLT
19 LID-SIDE ATTACHING PORTION
100 WHEEL LOADER

The invention claimed is:

1. An interlock mechanism of a motor, comprising
a terminal box configured to store a terminal used to connect a power supply cable to the motor;
a lid configured to close the terminal box;
a fixing member configured to fix the lid to the terminal box;
a first connector attached to the lid;
a second connector capable of being coupled with the first connector and configured to cover the fixing member in a state that the second connector is coupled with the first connector.

2. The interlock mechanism of a motor according to claim 1, wherein
the fixing member is a bolt configured to fasten the lid to the terminal box, and
a distance between the fixing member and the second connector attached to the first connector is shorter than an entire length of the fixing member.

3. The interlock mechanism of a motor according to claim 1, wherein
the fixing member receives an attachment/detachment tool of the fixing member from a side of the first connector.

4. The interlock mechanism of a motor according to claim 1, wherein
the lid has an attaching portion to which the first connector is attached.

5. The interlock mechanism of a motor according to claim 4, wherein
the lid has a plurality of the attaching portions.

6. The interlock mechanism of a motor according to claim 5, wherein
the number of the attaching portions is greater than the number of the first connector.

7. The interlock mechanism of a motor according to claim 6, wherein
the attaching portion has a plurality of positions to which the first connector is attached.

8. The interlock mechanism of a motor according to claim 7, wherein
the number of the positions to which the first connector is attached is greater than the number of the first connector.

9. The interlock mechanism of a motor according to claim 4, wherein
the lid has a plurality of lid-side attaching portions capable of supporting the attaching portion.

10. The interlock mechanism of a motor according to claim 9, wherein
the number of the lid-side attaching portions is greater than the number of the first connector.

11. The interlock mechanism of a motor according to claim 4, wherein
the attaching portion is integrated with the lid.

12. A motor comprising the interlock mechanism of a motor according to claim 1.

13. An interlock mechanism of a motor, comprising
a terminal box configured to store a terminal used to connect a power supply cable to the motor;
a lid configured to close the terminal box;
a plurality of fixing members configured to fix the lid to the terminal box;
a first connector attached to the lid;
a second connector capable of being coupled with the first connector and configured to cover at least one of the plurality of fixing members from a side of a removing direction thereof in a state that the second connector is coupled with the first connector; and
a plurality of attaching portions to which the first connector is attached, the number of which is greater than the number of the first connector, and which are capable of being integrated with the lid, wherein
a distance between the fixing member and the second connector attached to the first connector is shorter than an entire length of the fixing member, and the fixing member receives an attachment/detachment tool of the fixing member from a side of the second connector attached to the first connector.

* * * * *